US012569877B2

(12) United States Patent
DiMaggio et al.

(10) Patent No.: US 12,569,877 B2
(45) Date of Patent: Mar. 10, 2026

(54) HIGH SPEED POWDER COATING LINE FOR HEAT SENSITIVE SUBSTRATES

(71) Applicant: PPG Industries Ohio, Inc., Cleveland, OH (US)

(72) Inventors: Evan R. DiMaggio, Commerce Township, MI (US); Kevin C. Cross, Fort Worth, TX (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 18/709,095

(22) PCT Filed: Nov. 4, 2022

(86) PCT No.: PCT/US2022/079262
§ 371 (c)(1),
(2) Date: May 10, 2024

(87) PCT Pub. No.: WO2023/086751
PCT Pub. Date: May 19, 2023

(65) Prior Publication Data

US 2025/0025912 A1 Jan. 23, 2025

Related U.S. Application Data

(60) Provisional application No. 63/278,329, filed on Nov. 11, 2021.

(51) Int. Cl.

| | |
|---|---|
| ***B05B 16/00*** | (2018.01) |
| ***B05D 1/12*** | (2006.01) |
| ***B05D 3/02*** | (2006.01) |

(52) U.S. Cl.
CPC ............ *B05D 3/0227* (2013.01); *B05B 16/95* (2018.02); *B05D 1/12* (2013.01); *B05D 3/0263* (2013.01)

(58) Field of Classification Search
CPC ....... B05C 19/04; B05C 19/06; B05D 3/0227; B05D 1/12; B05D 3/0263; B05D 3/0413;
(Continued)

(56) References Cited

U.S. PATENT DOCUMENTS

| | | | |
|---|---|---|---|
| 5,721,052 | A | 2/1998 | Muthiah et al. |
| 6,890,604 | B2 | 5/2005 | Daniels |

(Continued)

FOREIGN PATENT DOCUMENTS

| | | | |
|---|---|---|---|
| EP | 1243340 | A2 | 9/2002 |
| GB | 2333725 | A | 8/1999 |

(Continued)

OTHER PUBLICATIONS

International Search Report and Written Opinion received for PCT Application Serial No. PCT/US2022/079262 dated Apr. 24, 2023, 16 pages.

*Primary Examiner* — William P Fletcher, III

(57) ABSTRACT

A system for applying a powder coating to a heat-sensitive substrate that may include at least one radiative oven, at least one convective oven, and a powder application system. The powder application system may include a plurality of powder application devices configured to apply powder to at least a top surface of the heat sensitive substrate while the heat sensitive substrate is oriented in a horizontal orientation.

8 Claims, 7 Drawing Sheets

(58) Field of Classification Search
CPC .... B05D 3/0426; B05D 7/04; B05D 2203/20; B05D 2252/04; B05D 2401/32; B05D 3/0236; B05D 3/0272; B05B 16/95; B05B 5/0418; B05B 13/0278; B05B 7/1454; B05B 14/48; F26B 3/283; F26B 3/30; F26B 15/18; F27B 9/062
USPC ........ 118/308, 310, 324, 325; 427/314, 475, 427/482, 493, 521, 522, 543, 545, 553, 427/557, 591, 592
See application file for complete search history.

(56) References Cited

U.S. PATENT DOCUMENTS

| | | | | |
|---|---|---|---|---|
| 7,507,294 | B2 | 3/2009 | Trevisan | |
| 9,162,245 | B1 | 10/2015 | Martin | |
| 2001/0018893 | A1 | 9/2001 | Arverus et al. | |
| 2002/0033134 | A1* | 3/2002 | Fannon | F26B 3/28 118/724 |
| 2003/0026897 | A1* | 2/2003 | Barberan Latorre | B05D 7/06 118/69 |
| 2007/0224343 | A1* | 9/2007 | Langlois | B05D 7/546 427/180 |
| 2009/0126628 | A1* | 5/2009 | Brendel | B05D 3/0209 118/621 |
| 2009/0181181 | A1* | 7/2009 | Hauer | B05D 7/06 427/493 |

FOREIGN PATENT DOCUMENTS

| | | | | |
|---|---|---|---|---|
| JP | 61-103580 | A | 5/1986 | |
| JP | 61-200880 | A | 9/1986 | |
| JP | 63-267475 | A | 11/1988 | |
| WO | WO-9705964 | A1 * | 2/1997 | B05D 3/067 |

* cited by examiner

HIGH SPEED POWDER COATING LINE FOR HEAT SENSITIVE SUBSTRATES

CROSS-REFERENCE TO RELATED APPLICATIONS

This application claims the benefit under 35 U.S.C. § 119 (e) of U.S. Provisional Application No. 63/278,329 filed on Nov. 11, 2021 which is incorporated by reference in its entirety.

FIELD OF INVENTION

The present disclosure relates to a process for applying a powder coating to a heat sensitive substrate, and specifically, a powder coating system that allows for powder coating of such substrates at high lines speeds.

BACKGROUND OF INVENTION

Powder coatings can be applied to a variety of different substrates and the applied powder coating may exhibit beneficial characteristics such as high durability, a desirable appearance, surface protection, and/or surface modifications and texturing. Traditional powder coating methods of have involved the use of apparatuses such as ovens, powder rooms, and cooling tunnels. In this case, methods of applying powder coatings to large substrates, such as doors, have included hanging the substrate and conveying the substrate through the coating application process. Further methods of powder coating have also included electrostatically charging the substrate before applying the coating.

SUMMARY OF THE INVENTION

In a first embodiment of the present disclosure, a system for applying a powder coating to a heat-sensitive substrate is provided. In this case, the system may include at least one radiative oven, at least one convective oven, and a powder application system. The powder application system may include a plurality of powder application devices configured to apply powder to at least a top surface of the heat sensitive substrate while the heat sensitive substrate is oriented in a horizontal orientation.

In a second embodiment of the present disclosure, a method for applying a powder coat to a heat-sensitive substrate is provided. In this case, the method may include conveying the heat-sensitive substrate horizontally at a first conveyance speed. The method may also include radiatively heating the heat-sensitive substrate in the horizontal orientation at the first conveyance speed. The method may also include convectively heating the heat-sensitive substrate in the horizontal orientation at a second conveyance speed. In some cases, the second conveyance speed may be less than the first conveyance speed. The method may also include applying powder to the heat-sensitive substrate in the horizontal orientation.

DETAILED DESCRIPTION

Figure 1A:
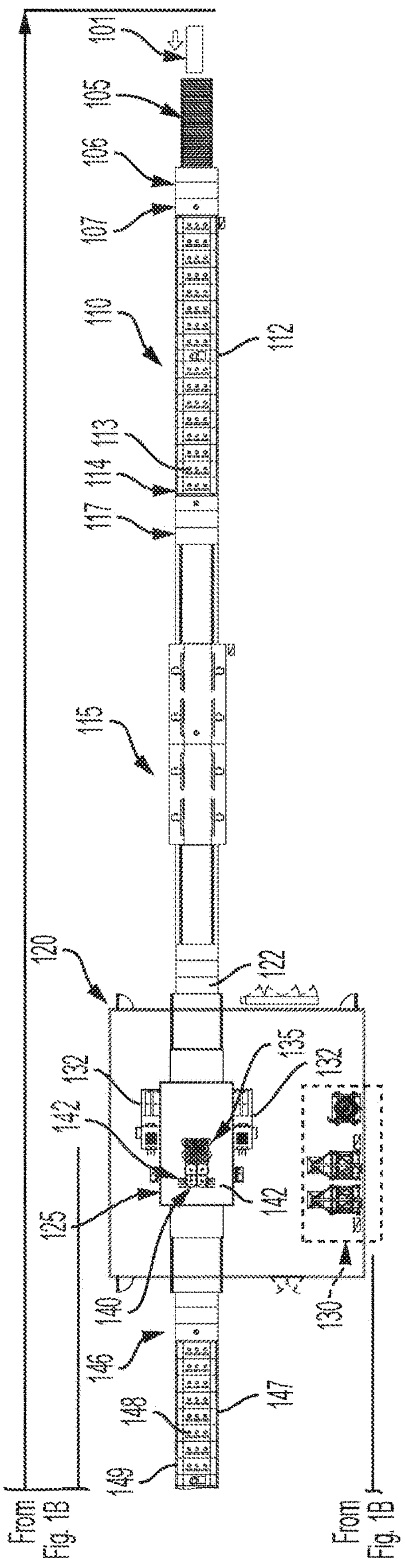
FIG. 1 illustrates a top down view of an embodiment of the powder coating system as described in the present disclosure.

The invention described herein includes a combination of processing steps that enables the high-speed powder coating of horizontally (flat) oriented substrates, which can be accomplished in a smaller physical space than typical continuous powder coating systems. However, the specific embodiments discussed herein are merely illustrative of ways to make and use the invention, and do not necessarily delimit the scope of the invention.

The present powder coating method may provide advantages over other powder coating technologies. For example, a common practice in the field of powder coating is to hang a substrate from a conveyance system so that when an electrical charge is applied to the substrate, and a powder coating is applied, the powder coating particles evenly coats the hanging substrate. However, this method has several drawbacks. In this case, such powder coating processes that utilize hanging are typically slow (e.g., have a low throughput rate of substrates), and attempts to increase the processing speed by these powder coating lines may resulted in uneven and/or poor adhesion of the coating on the substrate as well as a less than adequate aesthetic of the final product. Furthermore, the preheating, curing, and cooling of such substrates is typically performed in systems that require a large amount of floor space in a building (e.g., having a long lateral length). As such, current powder coating technologies utilizing traditional designs may be regarded as large and slow, and attempts to increase the line speed of such systems can result in compromised powder coating performance.

The present invention attempts to solve these problems by utilizing a combination of processing steps, which enables a relatively high throughput of horizontally oriented substrates through the powder coating process, while maintaining the quality of the resulting powder coated final product, which may also require less floor space than traditional continuous powder coating technologies. As such, the present invention described herein may be faster and smaller than traditional powder coating technologies, and can accomplish at least similar, if not better, powder coating application performance to such traditional technologies.

I. Definitions

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" polymer, "a" pigment, and the like refer to one or more of any of these items.

II. Powder Coating Process

FIG. 1 is an illustrative embodiment of a powder coating system 100. Powder coating system 100 comprises multiple components that can be configured to apply a powder coating to a substrate 101. These components can include an infeed 105, a conveyance system 106, a first radiative oven 110, a first convective oven 115, a powder application system 120, a second radiative oven 145, a second convective oven 150, a cooling tunnel 155, and an outfeed 160. Each of these components may be used in combination to powder coat substrate 101, which may be in a horizontal orientation (E.g., flat), and in some cases, coat substrate 101 at relatively high speeds, as will be described further herein.

As illustrated in FIG. 1, powder coating system 100 may be arranged in a linear fashion. For example, powder coating system 100 may be linearly configured, having a length 102 that can be approximately 525 feet long or less, and a width 103 that can be approximately 60 feet wide or less. As will be described further herein, either, or both, length 102 and width 103 may be smaller than traditional continuous powder coating technologies. However, it is to be understood that the configuration of the powder coating system 100 may be in a variety of shapes and/or sizes to accommodate the size of the room it is located within (e.g., nonlinearly configured, partially linearly configured, etc.). As such, although illustrated in a linear orientation, powder coating system 100 could comprise any number of orientations. In any of these cases, the overall floor space that powder coating system 100 occupies may be smaller than traditional continuous powder coating technologies.

Powder coating system 100 include substrates 101. Substrates 101 can be heat-sensitive substrates. Heat-sensitive substrates include substrate compositions that may be detrimentally affected by the application of either too much heating (e.g., too high a temperature) and/or too rapid a heating, whereas the exterior surfaces, interior structure, and or chemical composition of the substrate 101 may be damaged by such heating. Examples of heat sensitive substrates include wood, wood-based materials (e.g., medium-density fiberboard (MDF), plywood, particleboard, etc.), composites, and plastics. When powder coating heat-sensitive substrates, it is desirable to preheat the substrate 101 to a desired powder coating temperature prior to the application of the powder coating. In this case, the preheating enables desirable adhesion characteristics of the powder coating particles to the substrates 101, which contributes to a higher performing resulting powder coating. However, the methods in which substrates 101 are preheated and cured should avoid the detrimental effects that could be caused by either too much heating and/or too rapid a heating.

Substrates 101 may also be relatively large in size, having a relatively long lateral length and/or horizontal width. Examples of such large substrates 101 may be doors, building products, veneered materials, pressed and formed wood, panels, protective and decorative skins, fireboard, and protective sheeting. As described previously, traditional powder coating systems utilized for powder coating large substrate may require hanging of the substrate and applying the powder coating while substrate is in a vertical orientation. In this case, it may be beneficial to powder coat these relatively long and/or wide substrates 101 while in a flat (e.g., horizontal) orientation, rather than in a vertical orientation, to accommodate such geometries.

Powder coating system 100 includes conveyance system 106. Conveyance system 106 may be a conveyance system operable to move substrate 101 to and from the various components of powder coating system 100. Conveyance system 106 may be a line-type conveyor that allows for the horizontal movement of substrate 101 about powder coating system 100. Illustratively, conveyance system 106 moves substrate 101 laterally about length 102, however, in some cases (e.g., based upon a different arrangement of components of powder coating system 100) conveyance system 106 may move substrate 101 in a variety of directions in relation to length 102 (e.g., adjacently, tangentially, etc.)

Conveyance system 106 allows for the movement of substrate 101 about powder coating system 100 at relatively high speeds. For example, conveyance system 106 may allow for conveyance speeds of more than 10 feet per minute, more than 50 feet per minute, more than 75 feet per minute, 100 feet per minute or less, 125 feet per minute or less, 150 feet per minute or less, or any range or value encompassed by these endpoints. As such, conveyance system 106 may contribute to the high rate of processing of substrates 101 by such high line speeds.

Powder coating system 100 includes infeed 105. Infeed 105 may be the point at which substrates 101 enter powder coating system 100, and as such, the entry point of conveyance system 106. Infeed 105 is loaded with substrates 101, which may be by a manual process, an automated process, or a combination of manual and automated processes. Substrates 101 may be loaded into infeed 105 while in a horizontal (e.g., flat) orientation. Infeed 105 enables the high speed processing of substrates 101, whereas the amount (e.g., quantity) of substrates 101 fed by infeed 105 to conveyance system 106 may be based upon the processing speed of powder coating system 100. In this case, infeed 105 can be designed to feed substrates 101 at a rate based upon the processing of substrates 101 at speeds of more than 100 feet per minute.

Figure 1B:
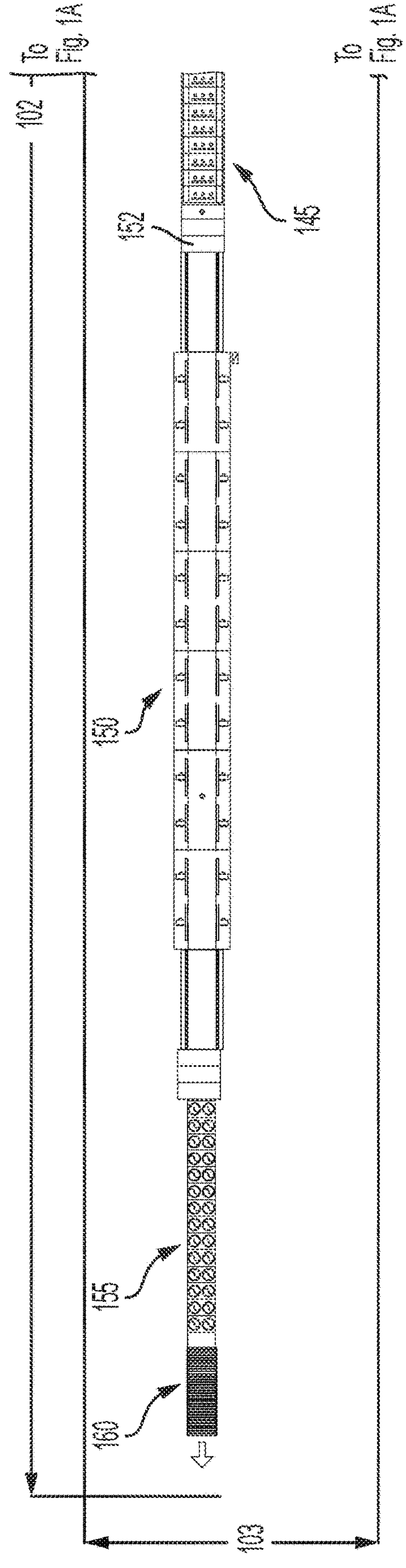
Figure 2B:
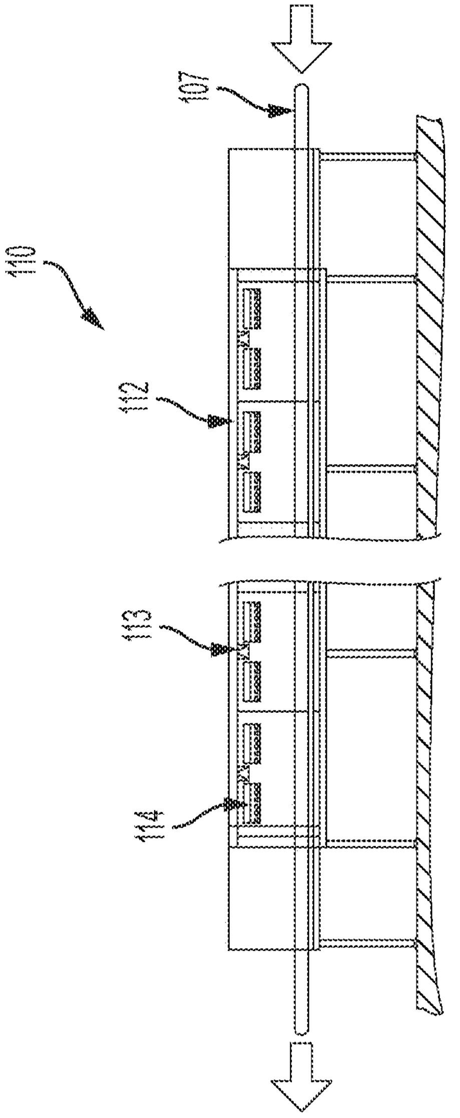
FIGS. 2A and 2B illustrate front and side views of an embodiment of a radiative oven as described in the present disclosure.
Figure 2A:
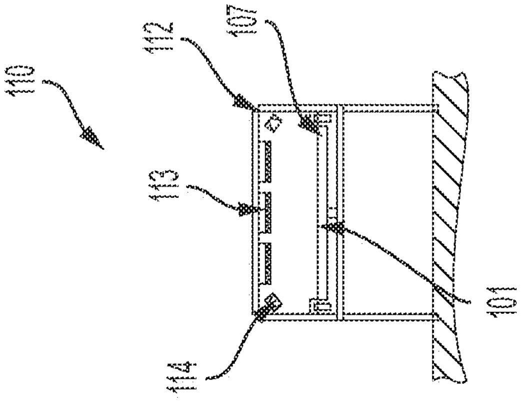

Powder coating system 100 includes first radiative oven 110. FIG. 1 illustrates a top-down view of first radiative oven 110 and FIGS. 2A and 2B further illustrate front and side views of first radiative oven 110. In combination, each of FIGS. 1, 2A and 2B illustrate the components of first radiative oven 110 including horizontal conveyance system 107, oven enclosure 112, first radiation emitters 113, and second radiation emitters 114. Each of the components of first radiative oven 110 may be used to rapidly pre-heat the exterior surfaces of substrate 101 while substrate 101 is in a horizontal (flat) orientation.

After being processed through infeed 105, substrate 101 travels along conveyance system 106 and is fed into first radiative oven 110. In this case, substrate 101 is received by horizontal conveyance system 107 in a horizontal (flat) orientation, and is moved through oven enclosure 112. First radiative oven 110 may include two types of radiation emitters: first radiation emitters 113 and second radiation emitters 114, which both may emit infrared radiation that contacts the exterior surfaces of substrate 101, heating the top and side surfaces of substrate 101 while substrate 101 moves laterally through first radiative oven 110. For example, first radiation emitters 113 may be positioned vertically above substrate 101 and emit radiation vertically down onto the top surface of substrate 101 while second radiation emitters 114 are positioned oblique to the top surfaces of substrate 101 (e.g., at a 45 degree angle in relation to the top surface of substrate 101), and emit radiation towards the sides of substrate 101. In this case, the combination of first radiation emitters 113 and second radiation emitters 114 may be used to irradiatively heat the top and side surfaces of substrate 101 while substrate 101 travels through oven enclosure 112 in a horizontal orientation.

Preheating substrate 101 allows for an effective adhesion of the powder coating particles to the surfaces of substrate 101. In this regard, an infrared oven is effective at quickly and efficiently raising the surface temperature of substrate 101 to a temperature set-point for effective adhesion of powder coating particles to the surface of substrate 101 during the powder coating process. In this case, infrared heating may efficiently preheat the surface of substrate 101 quickly and without effecting the inside portion of substrate 101, thus creating a large temperature gradient between the surface of substrate 101 and the area just below the surface of substrate 101. For example, first radiative oven 110 may preheat the surface of substrate 101 to a set-point surface temperature of approximately 280-325 degrees Fahrenheit.

First radiative oven 110 is configured to preheat substrate 101 for a targeted amount of time (e.g., a dwell time, resonance time, etc.). In this case, substrate 101 remains inside of the active heating zone of first radiative oven 110 for the desired dwell time, which may be based upon the amount of time necessary to preheat the surface of substrate 101 to the targeted temperature while avoiding damage to either the external or internal structures of substrate 101. For example, the dwell time necessary to heat the surface of substrate 101 to the targeted temperature of 280-325 degrees Fahrenheit may be approximately 30 seconds. In this case, substrate 101 remains in the active heating zone of first radiative oven 110 for 30 seconds, whereas the surface of substrate 101 reaches the 280-325 degree Fahrenheit preheating set point. However, in other cases, the dwell time required to reach the preheating temperature may be greater or less than 30 seconds, as based upon a variety of factors including the targeted surface temperature of the substrate 101 (e.g., higher targeted temperatures requiring a higher dwell time), the composition of substrate 101 (e.g., a lower thermally conductive composition requiring a longer dwell time) and/or any other applicable factor. Therefore, the 30-second dwell time may be adjusted based upon different operational conditions and/or compositions of substrate 101. Additionally, although described as utilizing only infrared radiation, the preheating of substrate 101 could comprise other methods including any combination of infrared, ultraviolet, or thermally convective/conductive radiation. As such, although described as being a radiative oven, first radiative oven 110 could utilize any sort of heating method to effectively pre-heat substrate 101 in a short time. As an exemplary embodiment, first radiative oven 110 may heat substrate 101 using short-wave infrared radiation, medium-wave infrared radiation, or a combination of short and medium wave infrared radiation.

First radiative oven 110 is designed to allow for the high line speeds, and therefore, the high processing speeds of powder coating system 100. In this case, first radiative oven 110 can accommodate the high rate of speed that substrate 101 is fed to first radiative oven 110 (e.g., the high line speed of conveyance system 106), and can pre-heat substrate 101 to the targeted surface temperature rapidly. For example, first radiative oven 110 can accommodate substrate feed speeds of 100 feet per minute or more, and can adjust, either alone or in combination, the intensity of radiation irradiated to the surface of substrate 101 the wavelength of the radiation irradiated to the surface of substrate 101, and/or the amount of time that radiation is irradiated to the surface of substrate 101 to meet the targeted surface temperature. As such, first radiative oven 110 may provide a great deal of flexibility over other powder coating methods, and particularly, provide flexibility in accommodating the high lines speeds/substrate processing capabilities of powder coating system 100.

Figure 3:
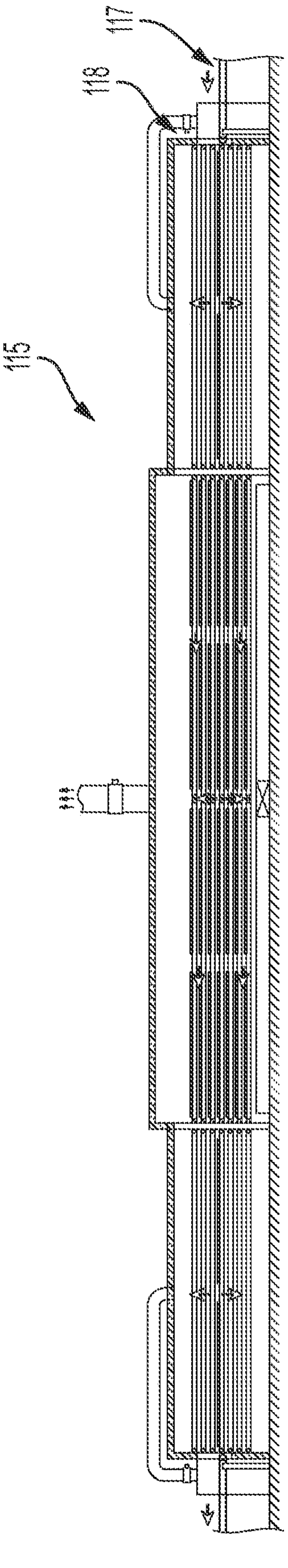
FIG. 3 illustrates a side view of an embodiment of a convective oven as described in the present disclosure.

Powder coating system 100 includes first convective oven 115. FIG. 1 illustrates a top-down view of first convective oven 115 and FIG. 3 further illustrates a side view of first convective oven 115. In combination, FIGS. 1 and 3 illustrate the components of first convective oven 115 including horizontal conveyance system 117 and layers 118. In this case, first convective oven 115 may be used to heat substrate 101 to a desired powder coating temperature, and for a desired amount of time, while substrate 101 is in a horizontal orientation.

After being preheated by first radiative oven 110, substrate 101 is transferred by conveyance system 106 to first convective oven 115. First convective oven 115 may be a thermally convective oven whereas thermal energy, as provided by a thermal energy source (e.g., a combustion chamber) is circulated through the heating zone of first convective oven 115 by one or more circulation devices (e.g., blowers, fans, etc.) and convectively heats substrate 101. However, although described as utilizing only convective thermal heating, it is understood that the heating of substrate 101 by first convective oven 115 could comprise other methods including any combination of thermally convective/conductive radiation, infrared radiation, and/or ultraviolet radiation. As such, although described as being a convective oven, first convective oven 115 could utilize any sort of heating method to effectively heat substrate 101 to the desired powder coating temperature.

Horizontal conveyance system 117 receives substrate 101, and substrate 101 is moved in a horizontal orientation into the heating zone of first convective oven 115. First convective oven 115 is configured to continue heating substrate 101 to a desired powder coating temperature set point. As described previously, the temperature at which the powder coating is applied to the surface of substrate 101 may affect the quality of the resulting powder coating. However, overheating a heat-sensitive substrate 101 may lead to damage of either the internal or external structures of substrate 101. In this case, first radiative oven 110 may have initially preheated the surface of substrate 101 to the desired preheating temperature, and first convective oven 115 may continue to heat substrate 101 to the desired powder coating temperature for an effective powder coating application. For example, first radiative oven 110 may have heated the exterior surface of substrate 101 to 280-325 degrees Fahrenheit. However, the radiative heating provided by first radiative oven 110 may have only penetrated substrate 101 to a limited thickness, and therefore, additional heating may be needed to effectively heat first substrate 101 to the desired powder coating temperature (e.g., heating substrate 101 to the powder coating temperature at a desired thickness within substrate 101). In this case, the thermal energy provided by first convective oven 115, although heating the surface of substrate 101 more slowly than radiative heating by infrared energy, may penetrate the surface of substrate 101 to a greater extent, and therefore, heat first substrate 101 more thoroughly than first radiative oven 110. As such, first radiative oven 110 and first convective oven 115 may be used in combination to effectively heat substrate 101 to the desired powder coating temperature.

In an exemplary embodiment, first convective oven 115 is a multi-level convection oven that can process and heat many individual substrates 101 at the same time. For example, first convective oven 115 receives substrate 101 from horizontal conveyance system 117, and loads each of the substrates 101 onto a horizontal layer 119 in groups of charges. The charges of substrates 101 are moved horizontally onto layer 119 and into the heating zone of first convective oven 115. Each of the layers 119 accommodates a defined amount of charges of substrates 101, and once the amount of charges have been loaded onto layer 119, layer 119 begins to ascend or descend vertically within the heating zone of first convective oven 115. Once layer 119 ascends or descends, further loading of additional charges of substrates 101 onto additional layers 119 begins.

Each of the charges of substrates 101 remain within the heating zone of first convective oven 115 for a desired dwell time, heating the substrates 101 to the targeted powder coating temperature. For example, first convective oven 115 may be configured to heat substrate 101 to a desired powder coating set-point temperature of approximately 280-325 degrees Fahrenheit and for a desired dwell time of 4 minutes. In this case, the charges of substrates 101 may remain within the heating zone for the entirety of the dwell time, as enabled by the horizontal and vertical travel of the charges of substrates 101 about the layers 119 of first convective oven 115.

Once the targeted dwell time has been reached, each of the charges of the substrates 101 are offloaded from the layers 119 in a reversely proportional order to the loading of such charges. For example, the first charges loaded onto the layers 119 of convective oven 115 may be the first substrates offloaded from the layers 119 of convective oven 115. Although described relating to a dwell time of four minutes, the amount of time that substrates 101 remain in the heating zone of first convective oven 115 may be based upon a variety of factors including the targeted powder coating temperature of substrate 101 (e.g., higher targeted temperatures requiring a higher dwell time), the composition of substrate 101 (a lower thermally conductive composition requiring a longer dwell time) and/or any other applicable factor. As such, in any of the foregoing cases, the dwell time may be adjusted so that the targeted powder coating temperature of substrate 101 is reached.

The use of the layering 108 of convective oven 115, and particularly, the combination of the horizontal and vertical travel of the substrates 101 throughout the heating zone of convective oven 115, may enable substrate 101 to remain in the heating area of first convective oven 115 for a relatively longer dwell time in relation to the linear length of the oven as compared to a traditional convective oven. In this case, the use of layers 119 increases the effective horizontal length of first convective oven 115 as compared to a traditional convective oven utilizing a single linear direction of travel, and therefore, first convective oven 115 may be smaller (e.g., have a lower linear length) than similar convective ovens used to heat a substrate 101 to the desired powder coating temperature. As such, a smaller first convective oven 115 may contribute to the reduction in the length 102 of powder coating system 100, as compared to traditional powder coating systems.

Furthermore, the combination of first radiative oven 110 and first convective oven 115 may provide advantages over other powder coating technologies. As described previously, first radiative oven 110 rapidly preheats (e.g., for 30 seconds) the exterior surface of substrate 101 to the desired preheating temperature whereas first convective oven 115 continues the heating of substrate 101 to the desired powder coating temperature through the use of horizontal and vertical substrate 101 travel within first convective oven 115. In this case, the rapid preheating of substrate 101 by first radiative oven 110 lowers the amount of thermal energy required to heat substrate 101 to the powder coating temperature, and therefore lowers the amount of dwell time required for substrate 101 to remain in first convective oven 115 to reach the desired powder coating temperature. In this case, since the dwell time is relatively lower, first convective oven 115 can be smaller than traditional ovens used for heating substrates, since the thermal energy required to heat the substrate to the powder coating temperature is less. Additionally, and as described previously, first radiative oven 110 and first convective oven 115 can accommodate the fast processing/line speeds of conveyance system 106. As such, in combination, the use of first radiative oven 110 and first convective oven 115 allows for a smaller mechanical footprint (e.g., a smaller length (L) 102) than traditional powder coating lines, while simultaneously accommodating higher throughput (e., processing of more substrates 101) and higher line speeds (e.g., higher lateral speeds of conveyance system 106) than traditional powder coating technologies.

Figure 4A:
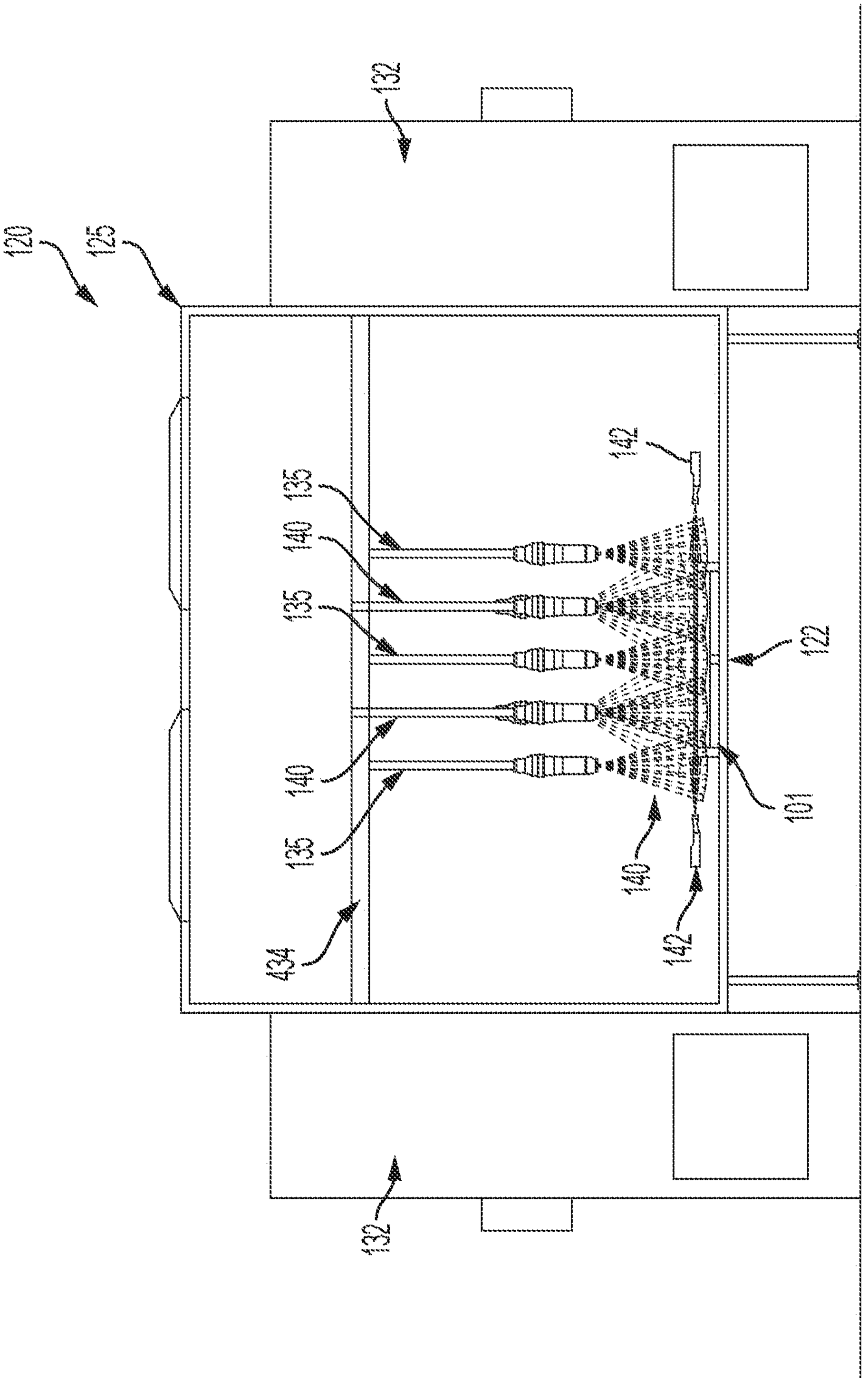
FIGS. 4A and 4B illustrates front and side views of an embodiment of a powder application system as described in the present disclosure.
Figure 4B:
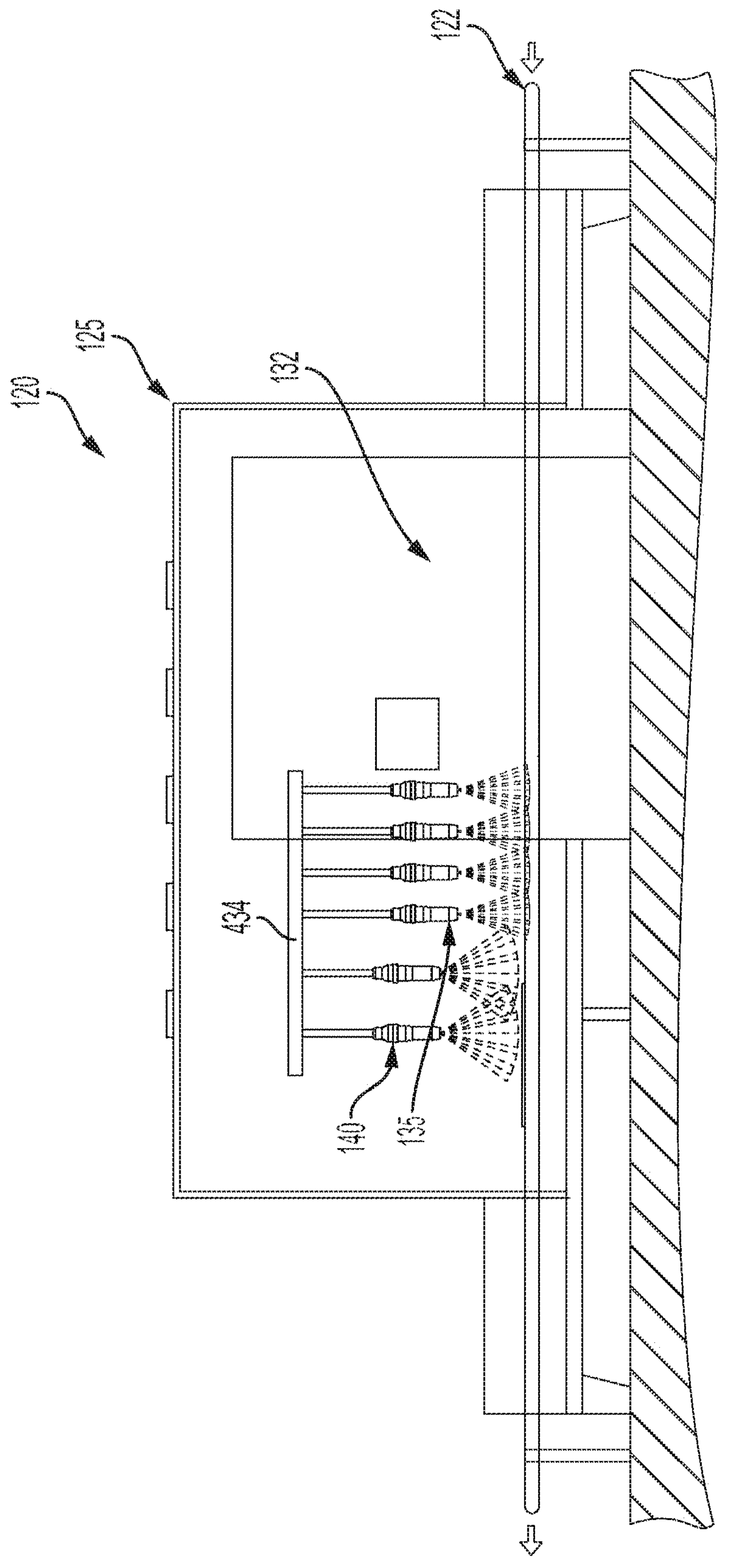
Figure 5B:
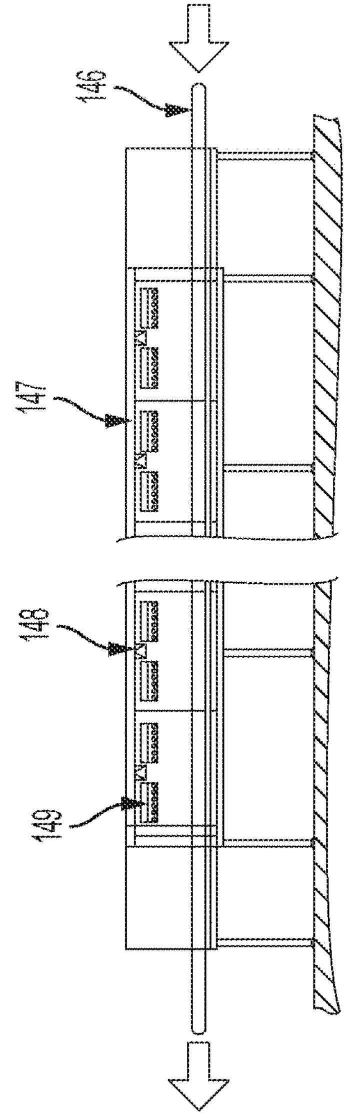
FIGS. 5A and 5B illustrates front and side views of an embodiment of a radiative oven as described in the present disclosure.
Figure 5A:
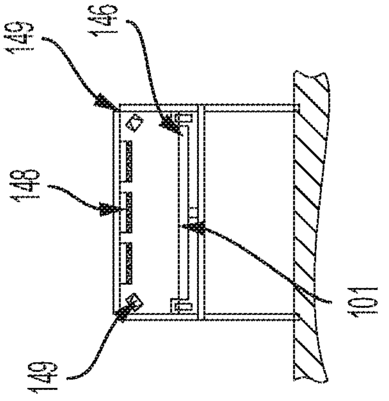

Powder coating system 100 includes powder application system 120. FIG. 1 illustrates a top-down view of powder application system 120, FIG. 4A illustrates a front view of powder application system 120, and FIG. 4B illustrates a side view of powder application system 120. In combination, each of FIGS. 1, 4A, and 4B illustrate the components of powder application system 120 including powder recovery enclosure 125, powder delivery system 130, first powder application devices 135, second powder application devices 140, third powder application system 142, horizontal conveyance system 122, powder recovery devices 132, and powder application device mount 434. Each of these components may be used in combination to powder coat substrate 101 in a horizontal orientation (e.g., substrate 101 oriented in a flat orientation) and may do so at the high rate of processing speeds, as described previously.

After exiting convection oven 115, substrate 101 enters powder application system 120. It is theorized that high powder coating performance depends on, among other factors, the amount of time between the preheating of substrate

101 and the application of the powder coating. In this case, the closer that substrate 101 is to the desired powder coating temperature, the higher the degree of adhesion of the powder coating particles to the surface of substrate 101. As such, reducing the time between the preheating of substrate 101 and the application of the powder coat may lead to higher powder coating performance.

As described previously, the combination of infeed 105, conveyance system 106, first radiative oven 110, and first convective oven 115 enables a high throughput speed (e.g., a line speed greater than 100 feet/minute) of substrate 101 through the heating portions of powder coating system 100. These high line speeds also minimizes the amount of time between the heating of substrate 101 (e.g., the exit of first convective oven 115) and the application of the powder coating, since substrate 101 takes very little time to enter powder application system 120 after being preheated. In this case, the high line speed minimizes surface temperature loss of substrate 101 whereas substrate 101 enters powder application system 120 as close to the powder coating set-point temperature as possible.

Powder application system 120 receives substrate 101 from conveyance system 106 at horizontal conveyance system 122. Horizontal conveyance system 122 moves substrate 101 through powder application system 120 in a lateral direction, whereas powder coating is applied to substrate 101 while substrate 101 is in a horizontal (flat) orientation about horizontal conveyance system 122. As described previously, traditional powder coating systems may require the substrate to be hung in order to effectively powder coat the outer surface of the substrate. In the case of powder application system 120, substrate 101 moves in a horizontal/linear fashion whereas powder coating is applied to substrate 101 without the need to re-orient substrate 101 vertically (e.g., hanging of substrate 101 is not required). As such, powder coating system 100 can attain the high throughput speeds at least in part because there is no need to reorient substrate 101 to a vertical orientation when powder coating, and rather, substrate 101 can move quickly through powder application system 120 horizontally.

Powder application system 120 includes powder recovery enclosure 125. Powder recovery enclosure 125 is an enclosure that houses the various components used to powder coat substrate 101 and allows for the recovery of over-sprayed powder coating during the powder coating process, as will be describe below in further detail relating to powder recovery devices 132. Powder recovery enclosure 125 may also be air-conditioned whereas the conditioning maintains a constant temperature that may be optimal for the powder coating process. For example, powder recovery enclosure 125 may be conditioned to maintain an internal temperature of approximately 80 degrees Fahrenheit during the powder coating process. FIG. 4 illustrates powder recovery enclosure 125 as a box shaped enclosure, however, powder recovery enclosure 125 could be arranged in any number of geometries (dome, etc.).

Powder application system 120 includes a powder delivery system 130. Powder delivery system 130 is external to powder recovery enclosure 125 and is operably coupled (e.g., fluidly and/or pneumatically coupled) to powder recovery enclosure 125, which supplies powder to each of the powder spraying applying of powder application system 120. In an exemplary embodiment, powder delivery system 130 comprises a primary bulk powder feeder, a redundant bulk powder feeder, and a powder sieve & distribution hopper. The combination of the primary bulk powder feeder, the redundant bulk powder feeder, and a powder sieve & distribution hopper are used to feed the various powder coating application devices of powder application system 120 including the first powder application devices 135, the second powder application devices 140, and the third powder application devices 142. The rate at which powder delivery system 130 feeds the various spraying devices of powder application system 120 may be based upon a variety of factors including the line speed of powder coating system 100 (e.g., a higher feed rate for a faster line speed), the desired amount of powder coating thickness on substrate 101 (e.g., a higher thickness requiring a higher feed rate), the size of substrate 101 (e.g., a longer/thicker substrate 101 requiring more powder) and/or any other applicable factor. As such, powder delivery system 130 may be designed to accommodate various lines speeds, substrate sizes, and powder coating specifications.

Powder application system 120 includes multiple powder application systems used to powder coat substrate 101 including first powder application devices 135, second powder application devices 140, and third powder application devices 142. First powder application devices 135, second powder application devices 140, and third powder application devices 142 are located within powder recovery enclosure 125, and are configured to apply the powder coating to substrate 101 as substrate 101 moves laterally through powder recovery enclosure 125 in a horizontal (flat) orientation.

First powder application devices 135 and second powder application devices 140 are configured to apply powder coating in a vertical direction. In this case, first powder application devices 135 and second powder application devices 140 are positioned vertically above substrate 101, and apply powder coating to substrate 101 from an orientation vertically above the top surface of substrate 101. For example, first powder application devices 135 and second powder application devices 140 may be mounted on powder application device mount 434, whereas powder application device mount 434 is located at a position vertically above horizontal conveyance system 122. In this case, powder application device mount 434 comprises a series of lateral bars extending over horizontal conveyance system 122 which may carry powder lines, electrical lines, data lines, fluid lines, powder coating lines, or other similar lines required to operate first powder application devices 135 and second powder application devices 140. It is also possible that powder application device mount 434 could be a flat plate with mounting holes or other configured mounting surfaces capable of receiving the first and second powder application devices 135 and 140.

As described previously, horizontal conveyance system 122 moves substrate 101 laterally through powder application system 120. First powder application devices 135 may be located closest to the entrance to the powder recovery enclosure 125, and therefore, apply the first application of powder to the top surface of substrate 101 while substrate 101 moves laterally through powder application system 120. For example, first powder application devices 135 may include a plurality of automatic, high-output overhead rotary atomizers, such as approximately 15-20 automatic, high-output overhead rotary atomizers, which spray powder onto the top surface of substrate 101 while substrate 101 is moved laterally through powder application system 120 by horizontal conveyance system 122. Second powder application devices 140 are located proximate first powder application devices 135, and at a greater lateral distance from the entrance of powder recovery enclosure 125. In this case, second powder application devices 140 apply a second application of powder to the top surface of substrate 101 while substrate 101 moves laterally through powder application system 120. For example, second powder application devices 140 may include a plurality of automatic, high-output overhead rotary atomizers, such as approximately 4 automatic, high-output overhead rotary atomizers, which spray powder onto the top surface of substrate 101 while substrate 101 is moved laterally through powder application system 120 by horizontal conveyance system 122, and after the first application of powder by first powder application devices 135.

First powder application devices 135 and second powder application devices 140 may be used in combination to apply an even powder coating layer to at least the top surface of substrate 101. For example, the diameter of the nozzles used in the atomizers of first powder application devices 135 may be a smaller diameter than the diameters of the nozzles used in the atomizers of second powder application devices 140. Therefore, the diameter of distribution of the spray distributed by each of the atomizers of first powder application devices 135 may be smaller than the diameter of distribution of the spray distributed by each of the atomizers of the second powder application devices 140. Furthermore, there may be more atomizers included in the first powder application devices 135 (e.g., 15-20 atomizers) as compared with second powder application devices 140 (e.g., four atomizers). As such, first powder application devices 135 may provide a higher density of powder coating to substrate 101 than the second powder application devices 140. The combination of first powder application devices 135 and second powder application devices 140 allows for a uniform density of powder coating to be applied to substrate 101, whereas the leading edge, top surface, and trailing edge of substrate 101 are evenly coated with powder as substrate 101 moves laterally through powder application system 120 in a horizontal (flat) orientation.

Third powder application devices 142 are configured to apply powder coating to the sides of substrate 101 while substrate 101 moves laterally through powder application system 120. For example, third powder application devices 142 include a pair of horizontally opposite sprayers, each positioned laterally adjacent to the opposing vertical sides of substrate 101. In this case, each of the sprayers sprays powder coating horizontally onto the side surfaces of substrate 101 while substrate 101 moves laterally through powder application system 120 by horizontal conveyance system 122. Illustratively, third powder application devices 142 are approximately in line with second powder application devices 140 (e.g., at the same horizontal distance from the entrance of powder recovery enclosure 125), however, third powder application devices 142 may be arranged differently in other embodiments. In some cases, third powder application devices 142 includes multiple standard automatic applicators, whereas each side of third powder application devices 142 includes two applicators positioned opposite one another about horizontal conveyance system 122, for a total of four applicators. However, it can be appreciated that more or less applicators may be utilized in some embodiments.

Each of first powder application devices 135, second powder application devices 140, and third powder application system 142 may be used in combination to effectively powder coat the top and sides of substrate 101 while substrate 101 is in a horizontal (flat) orientation. For example, and as described previously, first powder application devices 135 applies an initial dense coating of powder to substrate 101 as substrate 101 begins to move through powder recovery enclosure 125 by horizontal conveyance system 122. After the application of the first dense powder coating layer, second powder application devices 140 may apply a less dens coating of powder to the top of substrate 101 while third powder application devices 142 simultaneously applies powder coating to the sides of substrate 101. As such, the combination of first, second, and third powder application devices 135, 140, and 142 can be used in combination to apply the powder coating to the top and side surfaces (e.g., the top and two lateral side surfaces) of substrate 101 while substrate 101 moves through powder recovery enclosure 125 while substrate 101 is in a horizontal (flat) orientation. In this case, each of first, second, and third powder application devices 135, 140, and 142 may be designed to accommodate the high lines speed and or throughput of powder coating system 100.

Powder application system 120 includes powder recovery devices 132. Powder recovery devices 132 are used to recover overspread powder that did not adhere to substrate 101 during the powder coating process. For example, powder recovery devices 132 may be a pair of blowers with filter arrangements (e.g., cyclonic filters), whereas the powder and air mixture from the interior of the powder recovery enclosure 125 is drawn through the filters to remove non-adhered powder from the air. For example, powder recovery devices 132 each may include a blower and a filter, whereas the inlet to the powder recovery devices 132 are pneumatically coupled with the interior space of powder recovery enclosure 125, and the negative pressure supplied by the blower pulls the air and powder mixture into the filter whereas the powder is removed from the air. In this case, the recovered powder can be reused in the powder application process.

As described previously, the combination of first radiative oven 110 and first convective oven 115 allows for the rapid preheating of substrates 101 at high line speeds. Additionally, powder application system 120 allows for the rapid and effective powder coating of substrates 101 while substrate 101 are in a horizontal orientation. Therefore, the combination of first radiative oven 110, first convective oven 115, and powder application system 120 may be advantageous over traditional powder coating systems by allowing for the higher throughput of substrates (e.g., processing of more substrates 101) and higher line speeds (e.g., higher lateral speeds of conveyance system 106) as compared with traditional powder coating technologies, while also occupying less space (e.g., having a smaller length (L) 102) within a building.

Powder coating system 100 includes second radiative oven 145. FIGS. 1A and 1B illustrate a top-down view of second radiative oven 145 and FIGS. 5A and 5B further illustrate front and side views of second radiative oven 145. In combination, each of FIGS. 1A, 1B, 5A and 5B illustrate the components of second radiative oven 145 including horizontal conveyance system 146, oven enclosure 147, first radiation emitters 148 and second radiation emitters 149. Each of the components of second radiative oven 145 may be used to rapidly heat the powder coated exterior surfaces of substrate 101 while substrate 101 is in a horizontal (flat) orientation.

After being powder coated by powder application system 120, substrate 101 travels along conveyance system 106 and is fed into second radiative oven 145. In this case, substrate 101 is received by horizontal conveyance system 146 in a horizontal (flat) orientation, and is moved through oven enclosure 112. Second radiative oven 145 may include two types of radiation emitters: first radiation emitters 148 and second radiation emitters 149, which both may emit infrared radiation that contacts the exterior surfaces of substrate 101, heating the top and side surfaces of substrate 101 while substrate 101 moves laterally through second radiative oven 145. For example, first radiation emitters 148 may be positioned vertically above substrate 101 and emit radiation vertically down onto the top surface of substrate 101 while second radiation emitters 149 are positioned oblique to the top surface of substrate 101 (e.g., at a 45 degree angle in relation to the top surface of substrate 101), and emit radiation towards the sides of substrate 101. In this case, the combination of first radiation emitters 148 and second radiation emitters 149 may be used to irradiatively heat the top and side surfaces of substrate 101 while substrate 101 travels through oven enclosure 147 in a horizontal orientation.

The heating of the powder-coated substrate 101 causes the components of the applied powder coating to cure on substrate 101. For example, heating of the applied powder coating causes the components of powder coating to coalesce, liquefy, and cross-link, forming a finalized powder coating surface on substrate 101. In this case, an infrared oven is effective at quickly and efficiently raising the surface temperature of substrate 101 to a curing temperature set-point. The initial heating of the surface of the powder coated substrate 101 may initiate the curing of the powder coating components (e.g., cause the powder coating particles to gel) on the surface of substrate 101, whereas additional heat can be provided to continue to cure the powder coating. For example, infrared heating may efficiently heat the surface particles of the powder coating rapidly to a surface temperature of approximately 280-325 degrees Fahrenheit whereas the powder coating components begin to gel on the top and side surfaces of substrate 101. In some cases, the curing temperature may be the same as the preheating temperature (e.g., substrate 101 preheated by second convective oven 145 to the same preheating temperature as first convective oven 115), or in other cases, may be a different temperature (e.g., second convective oven 145 heating substrate 101 to a temperature greater, than or less than, the preheating temperature of first convective oven 115).

Second radiative oven 145 is configured to heat substrate 101 for a targeted amount of time (e.g., a dwell time). In this case, substrate 101 remains inside of the active heating zone of second radiative oven 145 for the desired dwell time, which may be based upon the amount of time necessary to heat the surface of substrate 101 to the targeted curing temperature while avoiding damage to either the external or internal structures of substrate 101. For example, the dwell time necessary to heat the surface of substrate 101 to the targeted temperature of 280-325 degrees Fahrenheit may be approximately 30 seconds. In this case, substrate 101 remains in the active heating zone of second radiative oven 145 for 30 seconds, whereas the surface of substrate 101 reaches the 280-325 degree Fahrenheit curing set point. However, in other cases, the dwell time required to reach the preheating temperature may be greater or less than 30 seconds, as based upon a variety of factors including the targeted surface temperature of the substrate 101 (e.g., higher targeted temperatures requiring a higher dwell time), the composition of the powder coating (a lower thermally conductive composition requiring a longer dwell time) and/or any other applicable factor. Therefore, the 30-second dwell time may be adjusted based upon different operational condition. Additionally, although described as utilizing only infrared radiation, the heating of substrate 101 could comprise other methods including any combination of infrared, ultraviolet, or thermally convective/conductive radiation. As such, although described as being a radiative oven, second radiative oven 145 could utilize any sort of heating method to effectively heat substrate 101. As an exemplary embodiment, second radiative oven 145 may heat substrate 101 using short-wave infrared radiation, medium-wave infrared radiation, or a combination of short and medium wave infrared radiation.

Second radiative oven 145 is designed to allow for the high line speeds, and therefore, the high processing speeds of powder coating system 100. In this case, second radiative oven 145 can accommodate the high rate of speed that substrate 101 is fed to second radiative oven 145 (e.g., the high line speed of conveyance system 106), and can heat the powder coated substrate 101 to the targeted curing temperature rapidly. For example, second radiative oven 145 can accommodate substrate feed speeds of 100 feet per minute or more, and can adjust, either alone or in combination, the intensity of radiation irradiated to the surface of substrate 101, the wavelength of the radiation irradiated to the surface of substrate 101, and the amount of time that radiation is irradiated to the surface of substrate 101 to meet the targeted surface temperature. As such, second radiative oven 145 may provide a great deal of flexibility over other powder coating methods, and particularly, provide flexibility in accommodating the high lines speeds/substrate processing capabilities of powder coating system 100.

Figure 6:
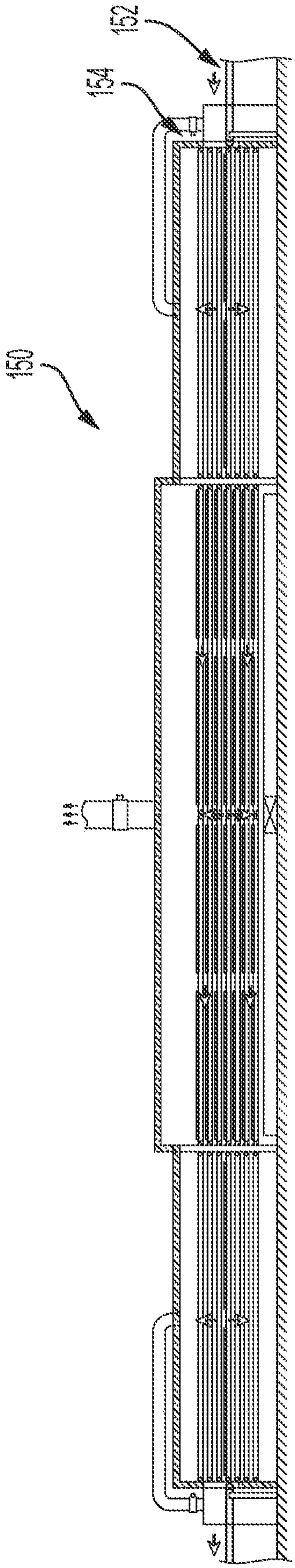
FIG. 6 illustrates a side view of an embodiment of a convective oven as described in the present disclosure

Powder coating system 100 includes second convective oven 150. FIG. 1B illustrates a top-down view of second convective oven 150 and FIG. 6 further illustrates a side view of second convective oven 150. In combination, FIGS. 1 and 6 illustrate the components of second convective oven 150 including horizontal conveyance system 152 and layers 154. In this case, second convective oven 150 may be used to heat substrate 101 to a desired powder coating curing temperature, and for a desired amount of time, while the powder coated substrate 101 is in a horizontal orientation.

After being heated by second radiative oven 145, substrate 101 is transferred by conveyance system 106 to second convective oven 150. Second convective oven 150 may be a thermally convective oven whereas thermal energy, as provided by a thermal energy source (e.g., a combustion chamber) is circulated through the heating zone of second convective oven 150 by one or more circulation devices (e.g., blowers, fans, etc.) and convectively heats substrate 101. However, although described as utilizing only convective thermal heating, it is understood that the heating of substrate 101 by second convective oven 150 could comprise other methods including any combination of thermally convective/conductive radiation, infrared radiation, and/or ultraviolet radiation. As such, although described as being a convective oven, second convective oven 150 could utilize any sort of heating method to effectively heat substrate 101 to the desired curing temperature.

Horizontal conveyance system 152 receives substrate 101, and substrate 101 is moved in a horizontal orientation into the heating zone of second convective oven 150. Second convective oven 150 is configured to continue heating substrate 101 to the curing temperature set point. As described previously, the applied powder coating may begin curing at a defined temperature, and holding the powder coating at that temperature may enable to curing of the powder coating particles to the surface of substrate 101. However, overheating a heat-sensitive substrate 101 may lead to damage of either the internal or external structures of substrate 101. In these cases, second radiative oven 145 may have initially heated the surface of substrate 101 to the desired curing temperature, and second convective oven 150 may continue to heat substrate 101 at the desired curing temperature for amount of time to fully cure the powder coating on substrate 101. For example, second radiative oven 145 may have heated the exterior surface of substrate 101 to 280-325 degrees Fahrenheit, and second convective oven 150 may hold substrate 101 at the curing temperature for an amount for time needed to fully cure the powder coating onto the surfaces of substrate 101. As such, second radiative oven 145 and second convective oven 150 may be used in combination to effectively cure the powder coating onto the surfaces of substrate 101.

In an exemplary embodiment, second convective oven 150 is a multi-level convection oven that can process and heat many individual substrates 101 at the same time. For example, second convective oven 150 receives substrate 101 from horizontal conveyance system 152, and loads each of the substrates onto a horizontal layer 154 in groups of charges. The charges of substrates 101 are moved horizontally onto layer 154 and into the heating zone of second convective oven 150. Each of the layers 154 accommodates a defined amount of charges of substrates 101, and once the amount of charges have been loaded onto layer 154, layer 154 begins to ascend or descend vertically within the heating zone of second convective oven 150. Once layer 154 ascends or descends, further loading of additional charges of substrates onto additional layers 154 begins.

Each of the charges of substrates 101 remain within the heating zone of second convective oven 150 for a desired dwell time, heating the powder coated substrates 101 to the targeted curing temperature. For example, second convective oven 150 may be configured to heat the powder-coated substrates 101 to a desired curing set-point temperature of approximately 280-325 degrees Fahrenheit and for a desired dwell time of 12 minutes. The charges of substrates 101 may remain within the heating zone for the entirety of the dwell time, as enabled by the horizontal and vertical travel of the charges of substrates 101 about the layers 154 of second convective oven 150.

Once the targeted dwell time has been reached, each of the charges of the substrates 101 are offloaded from the layers 154 in a reversely proportional order to the loading of such charges. For example, the first charges of substrate 101 loaded onto the layers 154 of second convective oven 150 may be the first substrates 101 offloaded from the layers 154 of second convective oven 150. Although described relating to a dwell time of twelve minutes, the amount of time that substrates 101 remain in the heating zone of second convective oven 150 may be based upon a variety of factors including the targeted curing temperature of the powder coating (e.g., higher targeted temperatures requiring a higher dwell time), the composition of the powder coating (e.g., a lower thermally conductive composition requiring a longer dwell time) and/or any other applicable factor. As such, in any of the foregoing cases, the dwell time may be adjusted so that the targeted curing temperature of the powder coated substrate 101 is reached.

The use of the layering 154 of second 150, and particularly, the combination of the horizontal and vertical travel of the substrates 101 throughout the heating zone of second convective oven 150, may enable substrate 101 to remain in the heating area of second convective oven 150 for a relatively longer dwell time in relation to linear length as compared to a traditional convective oven. In this case, the use of layers 154 increases the effective horizontal length of second convective oven 150 as compared to a traditional convective oven utilizing a single linear direction of travel, and therefore, second convective oven 150 may be smaller (e.g., have a lower linear length) than similar convective ovens used to heat a substrate 101 to the desired powder coating temperature. As such, a smaller second convective oven 150 may contribute to the reduction in the length 102 of powder coating system 100, as compared to typical powder coating systems. In this case, second convective oven 150 may be larger (e.g., have a longer linear length) than first convective oven 115 since the dwell time of second convective oven 115 (e.g., twelve minutes) is larger than first convective oven 115 (e.g., four minutes). However, in both cases, the floor size (e.g., length) of both first convective oven 115 and second convective oven 150 may be smaller than traditional convective ovens.

Furthermore, the combination of second radiative oven 145 and second convective oven 150 may provide advantages over other powder coating technologies. As described previously, second radiative oven 145 rapidly heats (e.g., for 30 seconds) the exterior powder coating layer of substrate 101 to the desired curing temperature, and second convective oven 150 continues the heating of the powder coated substrate 101 for a desired amount of time to fully cure the powder coating to substrate 101. In this case, the rapid heating of substrate 101 by second radiative oven 145 lowers the amount of thermal energy required to heat substrate 101 to the curing temperature, and therefore lowers the amount of dwell time required for substrate 101 to remain in second convective oven 150 in order for the powder coating to fully cure. In this case, since the dwell time is relatively lower, second convective oven 150 can be smaller than traditional ovens used for curing substrates, since the thermal energy required to heat the substrate to the curing temperature is less. Additionally, as described previously, second radiative oven 145 and second convective oven 150 can accommodate the fast processing/line speeds of conveyance system 106. As such, in combination, the use of second radiative oven 145 and second convective oven 150 allows for a smaller mechanical footprint (e.g., a smaller length (L) 102) than traditional powder coating lines, while simultaneously accommodating higher throughput (e.g., the processing of more substrates 101) and higher line speeds (e.g., higher lateral speeds of conveyance system 106) than traditional powder coating technologies Powder coating system 100 includes cooling tunnel 155. After being held in second convective oven 150 for an amount of time to effectively cure the powder coating to substrate 101, substrate 101 moves about conveyance system 106 to cooling tunnel 155. Cooling tunnel 155 may be a tunnel that utilizes forced convective cooling to rapidly cool the cured substrates 101. For example, cooling tunnel 155 may be a boxed shaped (or domed shaped) tunnel, whereas cold air is forced into cooling tunnel 155 (e.g., by blowers, fans, etc.), and the convective heat transfer supplied by the temperature differential between the powder coated substrate 101 and the air rapidly cools at least the surface of the powder coated substrate 101 to a temperature that enable stacking and/or handling of the powder coated substrate 101. For example, cooling tunnel 155 may cool the powder coated substrate 101 from the curing temperature of 280-325 degrees Fahrenheit to 100 degrees Fahrenheit in a very short amount of time. In this case, the design of the cooling tunnel may enable the high lines speeds/processing speeds of powder coating system 100.

Powder coating system 100 includes outfeed 160. Outfeed 160 may be the point at which the powder coated substrates 101 exit powder coating system 100, and as such, the exit point of conveyance system 106. After being cooled by cooling tunnel 155, outfeed 160 may offload the powder-coated substrates 101 and stack the powder-coated substrates 101 for shipment. In this case, the offloading may be by a manual process, an automated process, or a combination of manual and automated processes, and the stacking may result in palletized powder coated substrates 101 that are ready for shipment. In this case, substrates 101 may be offloaded by outfeed 160 in a horizontal (e.g., flat) orientation. Outfeed 160 enables the high speed processing of substrate 101, whereas the amount (e.g., quantity) of substrates 101 offloaded by outfeed 160 may be based upon the processing speed of powder coating system 100. In this case, outfeed 160 may be designed to offload powder coated substrates 101 at a line speed more than 100 feet per minute.

As described previously, infeed 105, conveyance system 106, first radiative oven 110, first convective oven 115, powder application system 120, second radiative oven 145, second convective oven 150, cooling tunnel 155, and outfeed 160 may be used in combination to powder coat a heat sensitive substrate in a horizontal (flat) orientation at higher lines speeds (e.g., line speeds at or above 100 feet per minute) and in a smaller area (e.g., a lower longitudinal length 102) than traditional powder coating technologies. However, it is to be understood that powder coating system 100 does not necessarily need to include all of the features of infeed 105, conveyance system 106, first radiative oven 110, first convective oven 115, powder application system 120, second radiative oven 145, second convective oven 150, cooling tunnel 155, and outfeed 160, but rather, could include only some of these features and still accomplishing the advantageous high-speed processing of horizontally oriented heat sensitive substrates described relating to each individual component As such, whereas particular embodiments of this invention have been described above for purposes of illustration, it will be evident to those skilled in the art that numerous variations of the details of the present invention may be made without departing from the invention as defined in the appended claims.

The invention claimed is:

1. A system for applying a powder coating to a heat-sensitive substrate, the system comprising:

at least one radiative oven;

at least one convective oven;

a powder application system including a plurality of powder application devices configured to apply powder to at least a top surface of the heat sensitive substrate while the heat sensitive substrate is oriented in a horizontal orientation; and a conveyance system that allows for conveyance speeds of more than 50 feet per minute, and wherein the at least one radiative oven preheats the heat sensitive substrate for no more than 30 seconds.

2. The system of claim 1, wherein the at least one radiative oven is positioned prior to the powder application device and is configured to preheat the heat sensitive substrate prior to the application of the powder.

3. The system of claim 1, wherein the at least one radiative oven preheats the heat-sensitive substrate with infrared radiation.

4. The system of claim 1, wherein the at least one radiative oven comprises a first radiative oven and a second radiative oven, the first radiative oven positioned prior to the powder application system and the second radiative oven positioned after the powder application system.

5. The system of claim 4, wherein the first radiative oven is configured to preheat the heat-sensitive substrate prior to the application of the powder, and the second radiative oven is configured to heat the heat-sensitive substrate to a curing temperature after the application of the powder.

6. The system of claim 1, wherein the at least one convective oven is positioned prior to the powder application device, and is configured to heat the heat sensitive substrate prior to the application of the powder.

7. The system of claim 1, wherein the at least one convective oven comprises a first convective oven and a second convective oven, the first convective oven positioned prior to the powder application system and the second convective oven positioned after the powder application system.

8. The system of claim 7, wherein the first convective oven is configured to heat the heat-sensitive substrate to a powder coating temperature prior to the application of the powder, and the second convective oven is configured to heat the heat-sensitive substrate to a curing temperature after the application of the powder.

* * * * *